Figure 1:
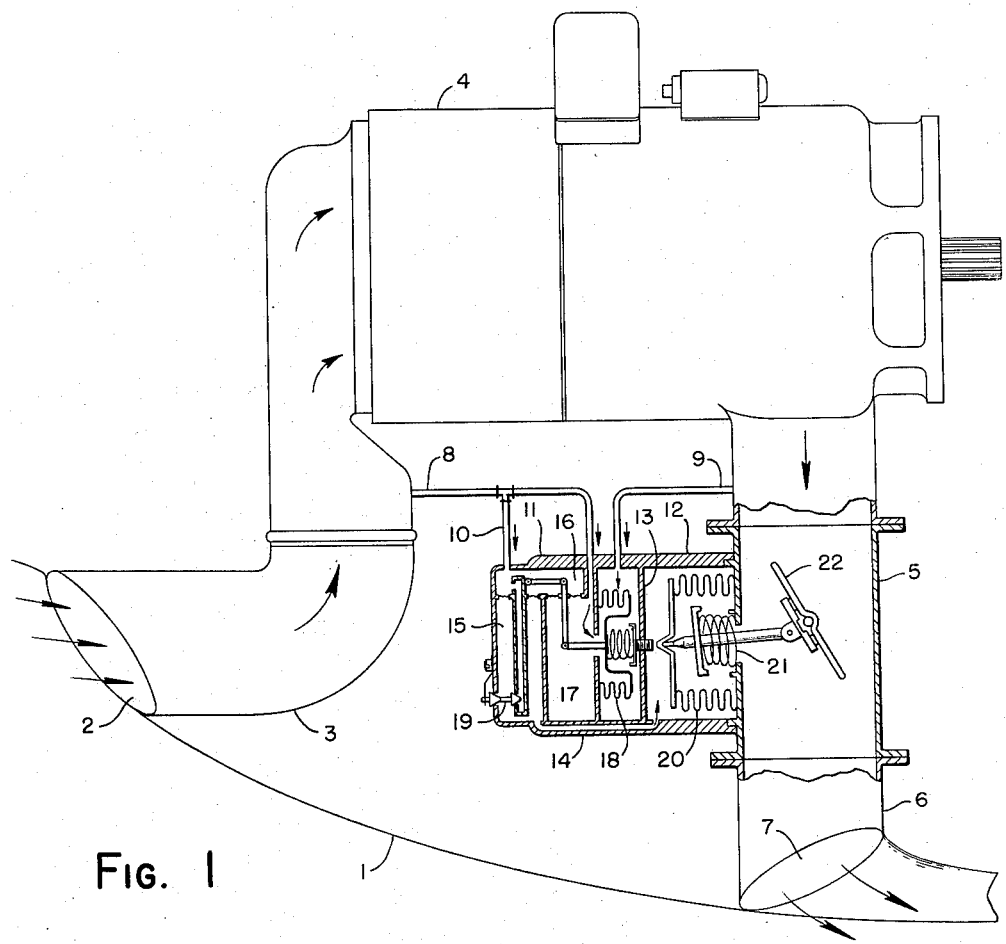

Feb. 3, 1959 J. F. SHANNON 2,871,878
FLUID PRESSURE CONTROL SYSTEM
Filed July 20, 1953

INVENTOR.
JACK F. SHANNON
BY
Raymond W. Junkins
ATTORNEY

United States Patent Office 2,871,878
Patented Feb. 3, 1959

2,871,878

FLUID PRESSURE CONTROL SYSTEM

Jack F. Shannon, Euclid, Ohio, assignor to Bailey Meter Company, a corporation of Delaware Application July 20, 1953, Serial No. 368,890

2 Claims. (Cl. 137—486)

The present invention is directed to control systems for fluid streams. More specifically the invention is directed to the control of a fluid stream to maintain a differential between pressures in the fluid stream taken at two different locations along the fluid stream.

The invention has been specifically embodied in a control system directed to the regulation of the air-cooling of an aircraft electric generating unit. Electric generators, driven from the power plant, are vital mechanisms of aircraft. Heat is generated by these units, along with electrical energy, and must be conducted away from the units to prevent the temperature rising to the point where the insulation of the electric wiring, and other parts, is endangered. The thrust pressure of the air through which the aircraft is moved is the obvious source for the cheapest medium to accomplish desired cooling. A simple arrangement will have the duct tapping the source of air and directing it through and/or over the generator and then discharging it to the outside of the aircraft.

The initial question asks why would such simple arrangement of air-cooling need any regulation. It might appear, superficially, that unrestrained flow, through the duct-work, of whatever air stream is available, would serve the purpose of coiling the generator satisfactorily. However, not only may the generator be cooled below some design point of operating efficiency, but reception into the duct work of more than sufficient air needed for cooling may convert thrust pressure into heat when it could be utilized aerodynamically to contribute to the performance of the aircraft. Thus the reasons for control of the flow of the air may involve other factors than the temperature of the generator. Whatever the reasons for control, however, the element utilized, in the present invention, is the differential in pressures taken across the generator in the path of air flowing through the duct-work having an entrance scoop projected into the air stream. A range of desired differential pressure is established and the invention maintains such pressure.

The structure for control of flow of air through the duct functions to restrict, or throttle, the flow. A simple butterfly valve, located in the portion of the duct exhausting from the generator cooled, is positioned under the control of the differential pressure. The differential pressure is maintained as nearly constant as possible, throughout the range of thrust pressure available in the duct.

The core of the invention is centered about the mechanism responsive to the differential pressure and exerting a positioning force on the damper determining the differential. This mechanism includes a relay which produces a fluid pressure used to position the valve. The fluid pressure produced, of course, is a modification of a supply to the relay mechanism. The relay is unique in being able to utilize the fluid pressure of the duct itself as its supply. Therefore, the structure of the invention is a control system which needs no power other than that derived from the very medium it controls.

The primary objective of the invention then becomes apparent as control of a fluid flow with power derived from the flow itself.

Another object is to provide mechanism for control of the fluid flow from pressure differentials taken across a unit consuming, or otherwise utilizing, the fluid.

Still another object is to provide structure for control of the fluid flow which is self-contained, requiring a minimum of maintenance, and is completely automatic in its function.

In the drawings:

Fig. 1 is the preferred embodiment of the invention applied to an electric generator carried within an aircraft.

Figure 2:
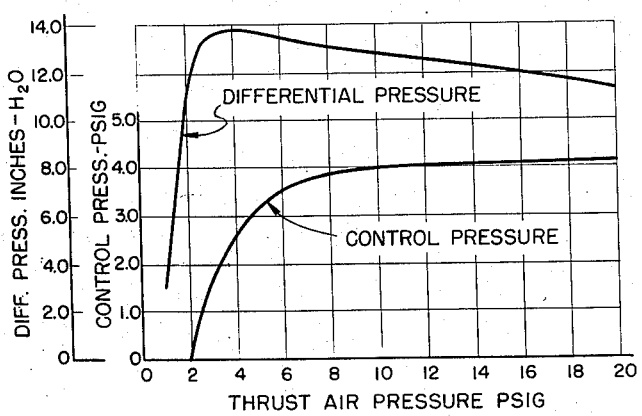

Fig. 2 discloses graphs of curves illustrating performance of the structure of Fig. 1.

Referring to Fig. 1, it must be first fully appreciated that the invention is very specifically embodied in the control system of an air-cooled electric generator carried in an aircraft. Any situation calling for maintenance of a constant differential condition in a duct by manipulation of a flow-restricting valve in the duct can be served by the invention. The specific embodiment will, however, serve to illustrate how the invention operates under particular conditions.

Very generally, at 1, there is illustrated the profile of a cross-section of a portion of a lower location on the fuselage of an aircraft. An air-scoop opening is indicated at 2 from which an entrance duct 3 extends into the interior of the aircraft and through an electric generator housing 4.

Only the bare outline of the generator housing is indicated. Some indication has been given of the spline on the end of the generator shaft. This spline is geared, through a train of gears, to the main shaft of the power plant of the aircraft. The rotation of this generator shaft produces both electrical output desired as well as the heat which must be conducted from the unit for safety.

From the generator 4, the duct-work discharges into a valve section 5. A discharge duct section 6 conveys the air to discharge scoop 7 where it carries the heat it has picked up from the generator to the atmosphere outside the aircraft.

With the generator at 4 representing a device cooled by the air thrust into opening 2 and passes along 3, there are next disclosed pipe taps 8 and 9 which are placed in the duct-work at the entrance to, and exit of, generator 4. These taps carry the static pressure in the duct at these points, and it is the difference between them which is held within prescribed limits by the invention.

Pipe tap 8 has a tap 10 branching from it into the relay mechanism for provision of supply pressure to be modified into control pressure. This housing is disclosed in cross-section and is really in two parts which will be designated as relay housing 12. Wall 13 separates these two housings and a conduit 14 carries the relay output to the power operator.

The structure of the relay within housing 11 is arranged as disclosed in an application S. N. 289,402, filed May 22, 1952, by Harvard H. Gorrie and Jack F. Shannon, now Patent No. 2,737,963. The essential arrangement of this relay establishes three chambers 15, 16 and 17 with a supply pressure from intermediate chamber 16 being valved into chamber 15 by linkage actuated from chamber 17.

The linkage in the three chambers should be carefully considered for complete understanding of the operation of the invention. The linkage goes through diaphragm members forming walls between the various chambers. The one end of the linkage, in chamber 17, is mechanically actuated by bellows 18. This motion is transmitted to the other end of the linkage which terminates in a tubular member conducting the pressure of chamber 16 to a valve member 19. This valve 19 functions to keep chamber 15 sealed, to admit pressure from chamber 16 into chamber 15, or to exhaust pressure from chamber 15 to atmosphere. The ultimate purpose of manipulation of this valve 19 is to establish a pressure in chamber 15 which is conducted, by conduit 14, as the output of the relay.

Bellows 18 is restrained in one direction of its movement by a spring which serves to calibrate the actuation of the bellows by forces imposed thereon. The forces imposed thereon are here illustrated as the pressures from taps 8 and 9. This spring tension is adjustable and aids, or opposes, the differential pressure which is controlled. The operation becomes very easily understood in that when bellows 18 moves, valve 19 adjusts the pressure in chamber 15 from the supply pressure from pipe tap 10, or by exhaust to atmosphere. This output of chamber 15 is then conducted to the power operator housing 12.

In housing 12 the dominant feature is power bellows 20. The output pressure of conduit 14 on the outside of bellows 20 causes the bellows to collapse against the force of spring 21 in mechanical actuation of valve 22 in section 5.

Note should be made of the position and actuation of valve 22 in section 5. Closure of the valve in section 5 is arranged to be ahead of the opening into the interior of bellows 20. With the pressure drop across the valve, the downstream side is maintained at substantially atmospheric pressure. This arrangement is desirable in order to maintain at a minimum the force opposing the relay output on the other side of bellows 20.

We are now prepared to go to Fig. 2 where the operation of the disclosed embodiment is analyzed over a range of anticipated pressures in entrance duct 3. There are several choices of curves which can be plotted from data taken over the performance of this embodiment of the invention. However, indication of how well the differential pressure is maintained and the variation of the control pressure as the output of relay 11, which positions valve 22, is seen as giving an adequate appreciation of the utility of the invention.

The relay 11 does not begin to exert its control function until the differential rises close to its desired value. Therefore, a control pressure begins to appear at about 2 p. s. i. g. thrust pressure. With a desirable differential pressure of 12 ins. water it can be seen, by the plot of Fig. 2, that the invention maintains differential well within plus or minus 2"—H$_2$O from 2 p. s. i. g. to 20 p. s. i. g. of thrust pressure. This control function is carried out with the simple embodiment of the invention disclosed, automatically, and with a minimum of maintenance and other attention Again it must be appreciated that the specific embodiment given the present invention in no sense limits the scope of the appended claims.

What I claim, and desire to secure by Letters Patent of the United States, is:

1. A control system for fluid flow, including, a conduit for the fluid flow, a section in the conduit utilizing the properties of the fluid flow and creating a difference in pressure across itself, a valve in the conduit located downstream of the utilizing section of the conduit, a housing mounted on the conduit adjacent the valve, a first chamber in the housing with a movable spring-loaded wall connected to the valve, a second and third chamber in the housing separated by a spring-loaded movable wall, pipe taps conducting each of the differential pressures to each of the second and third chambers, a fourth chamber, a relay valve in the fourth chamber connecting the fourth chamber with the higher of the differential pressures and atmosphere, flexible wall pivots in the third and fourth chambers, linkage through the wall pivots to connect the spring-loaded movable wall between the second and third chambers and the relay valve in the fourth chamber while extending outside the third and fourth chambers, and a pipe between the fourth chamber and the first chamber.

2. The system of claim 1 wherein, the spring-loaded wall of the first chamber in the housing is arranged directly between the first chamber pressure and that of the conduit, and the valve is arranged to move toward closure upstream of the first chamber wall.

References Cited in the file of this patent

UNITED STATES PATENTS

| | | |
|---|---|---|
| 894,784 | Vivian | July 28, 1908 |
| 1,744,872 | Earl | Jan. 28, 1930 |
| 1,745,059 | Rush | Jan. 28, 1930 |
| 1,934,713 | Hughes | Nov. 14, 1933 |
| 2,326,238 | Mabey | Aug. 10, 1943 |
| 2,406,181 | Wiegand | Aug. 20, 1946 |
| 2,540,193 | Eckman | Feb. 6, 1951 |
| 2,564,108 | Holley | Aug. 14, 1951 |
| 2,651,517 | Davies | Sept. 8, 1953 |
| 2,723,615 | Morris | Nov. 15, 1955 |
| 2,731,974 | Krueger | Jan. 24, 1956 |
| 2,737,963 | Gorrie et al. | Mar. 13, 1956 |

FOREIGN PATENTS

| | | |
|---|---|---|
| 241,065 | Switzerland | June 17, 1946 |